United States Patent [19]

Minoura et al.

[11] 4,270,858
[45] Jun. 2, 1981

[54] SCANNING AND PROJECTING DEVICE

[75] Inventors: Kazuo Minoura, Yokohama; Muneharu Sugiura, Tokyo; Setsuo Minami, Kawasaki; Tadashi Sato, Kokubunji, all of Japan

[73] Assignee: Canon Kabushiki Kaisha, Tokyo, Japan

[21] Appl. No.: 85,493

[22] Filed: Oct. 17, 1979

[30] Foreign Application Priority Data

Oct. 20, 1978 [JP] Japan ............................. 53-129734

[51] Int. Cl.³ .......................................... G03G 15/28
[52] U.S. Cl. ........................................ 355/8; 355/66
[58] Field of Search ..................... 355/8, 45, 60, 66

[56] References Cited
U.S. PATENT DOCUMENTS 3,542,467 11/1970 Ferguson et al. ................ 355/8
4,135,812 1/1979 Kingsland ....................... 355/8 X

*Primary Examiner*—R. L. Moses
*Attorney, Agent, or Firm*—Fitzpatrick, Cella, Harper & Scinto

[57] ABSTRACT

A scanning and projecting device for scanning a first plane by a light deflecting device interposed between the first plane and a second plane, and sequentially projecting a partial plane of the first plane scanned by the deflector onto a predetermined position on the second plane, in which a projecting optical system is disposed between the deflector and the second plane, the projecting optical system is titled in synchronism with the deflecting action of the deflector within a deflecting plane where light beam from the first plane is deflected by the deflector, and at least a part of the optical members constituting the projecting optical system moves in the direction of the optical axis in synchronism with the deflecting action of the deflector.

8 Claims, 22 Drawing Figures

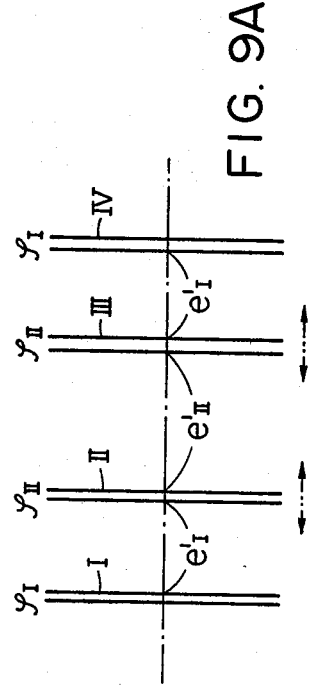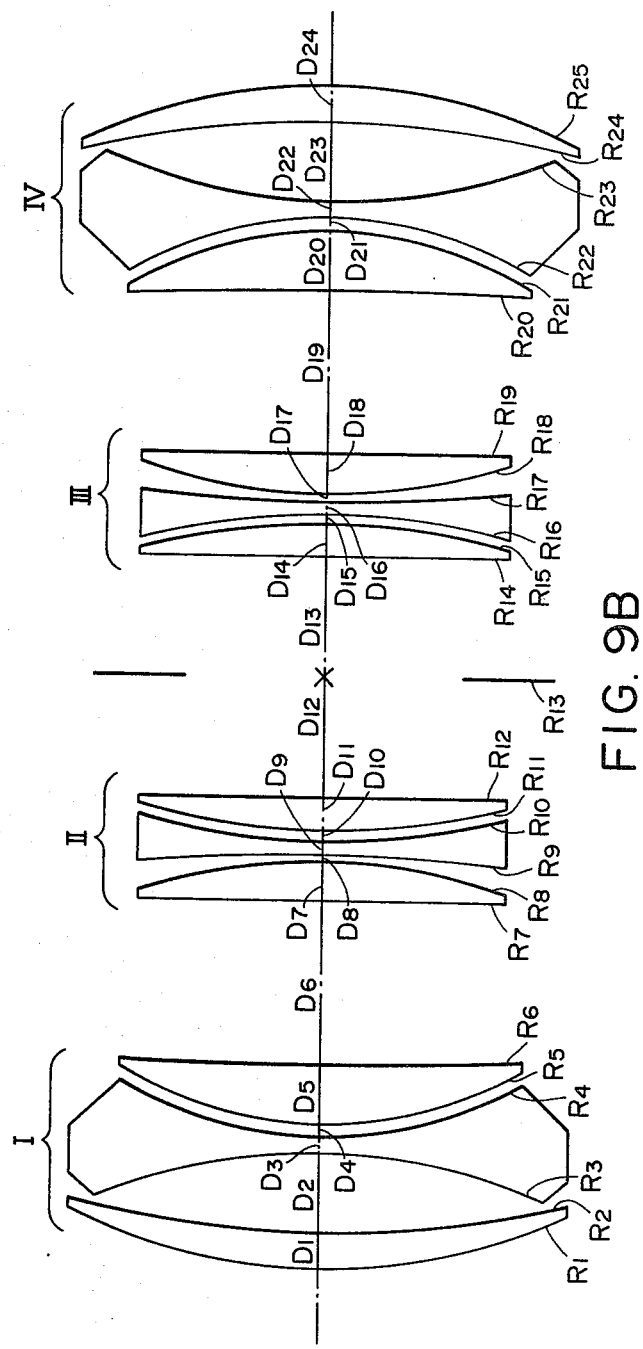

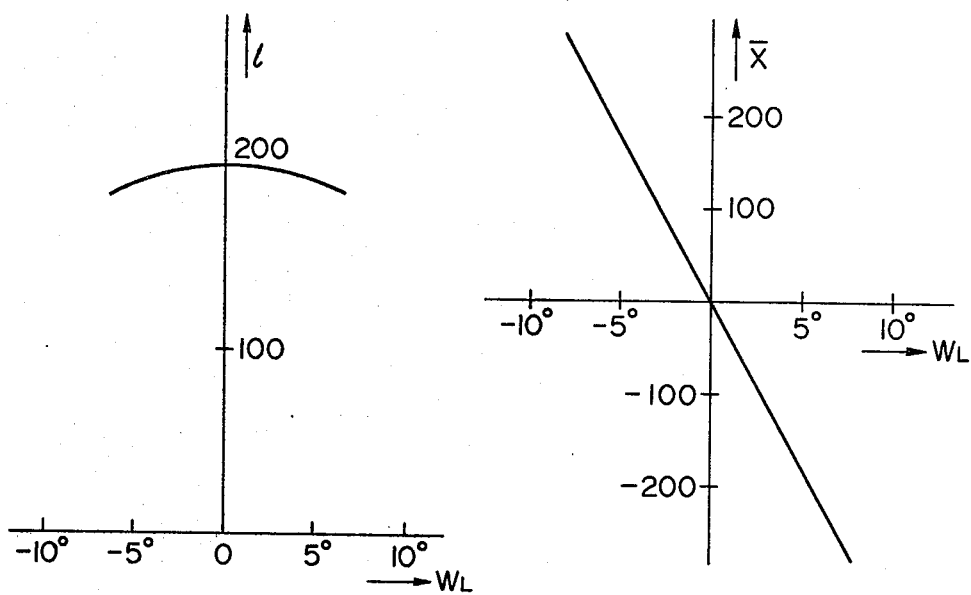
FIG. 13
FIG. 14
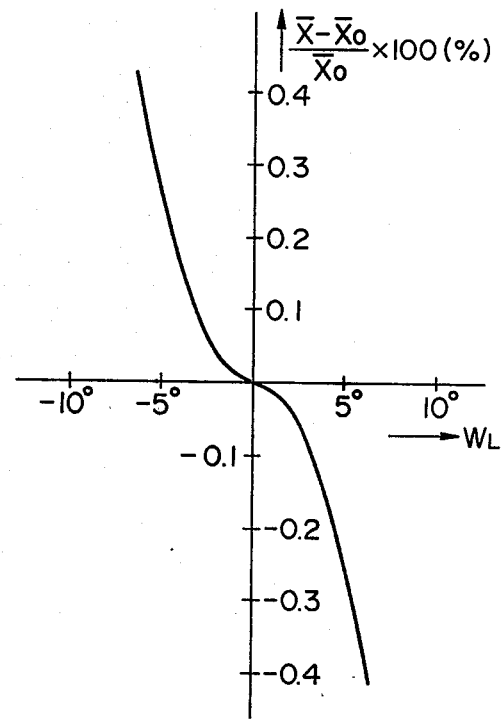
FIG. 15

SCANNING AND PROJECTING DEVICE

BACKGROUND OF THE INVENTION

1. Field of the Invention

The present invention relates to a slit-scanning and image-projecting device to slit-scan information on a flat scanning plane by the use of a deflector, and to project the same on the surface of a light receiving member.

2. Description of the Prior Art

It has been well known that an optical device of a type, which scans a flat scanning plane in the form of a slit by use of a deflecting device such as rotatory or oscillatory reflecting mirror, and sequentially projects informations on the scanning surface to a light receiving surface, is capable of transmitting the information on the scanning surface to the light receiving surface at a high speed, and is therefore considered a very effective projecting device from the standpoints of vibration and mechanical construction.

FIG. 1 of the accompanying drawing is a schematic diagram showing one embodiment of a conventional scanning and projecting device using a rotatory mirror as the deflector, wherein the flat scanning surface 1 is scanned by the rotatory reflectng mirror 2 in the form of a slit-shaped scanning surface 3 with a breadth $l_O$ to be determined by a slit (not shown), and the slit-shaped scanning surface 3 is focussed on the a light receiving surface 6 by the projecting optical system 5. In case, however, the flat scanning surface is scanned by using the rotatory scanning mirror 2, there exists such a difficulty that the light path length between the scanning surface 1 and the light receiving surface 6 varies with rotation of the rotatory scanning mirror 2. In more detail, if it is assumed that the position of the rotatory scanning mirror when the distance between the rotatory scanning mirror 2 and the scanning surface 1 is the shortest ($L_O$) be a reference position, and a distance between the scanning mirror 2 and the scanning surface 1 when the scanning mirror rotates by $\theta$ degree from the reference position be $L_O + \Delta L$, the following relationship is established.

$$\Delta L = (\frac{1}{\cos\theta} - 1) L_O$$

(where: $\Delta L$ is a quantity of displacement in the light path length to occur by rotation of the scanning mirror 2, which reaches its maximum value of 41.4 mm in the case of, for example, $|\theta| \leq 25°$, $L_o = 400$ which data can be contemplated usually.

As an expedient for correcting such variations in the light path length, there is disclosed in Japanese patent publication No. 50-9182 a device, in which parallelly moving mirrors are provided in the front and back positions of the projecting optical system covering a span from the rotatory reflecting mirror to an image plane, thereby correcting variations in the light path length, and moving the projecting optical system to eliminate variations in the conjugative layout.

Also, in U.S. Pat. No. 3,537,373, there is taught a device, in which two lens elements in the projecting optical system are synchronously actuated in parallel with the optical axis to remove variations in the light path length and the conjugative lay-out.

In case, however, of using the rotatory reflecting mirror in a reproduction apparatus, there is an additional difficulty besides the abovementioned variations in the light path length, i.e., tilting of the scanning plane 1 in accordance with a rotational angle of the rotatory reflecting mirror 2 as viewed from the side of the light receiving surface 6. In other words, considering a mirror image 4 of the slit-shaped scanning plane 3 scanned by the rotatory reflecting mirror 2, this mirror image 4 is disposed with inclination by the rotational angle $\theta$ of the rotatory reflecting mirror 2 relative to the optical axis of the projecting optical system 5. This state will hereinafter be called "tilting". Also, an image 7 on the light receiving surface 6 of this slit-shaped scanning plane 3 scanned by the projecting optical system 5 is tilted by the same angle $\theta$. This phenomenon of blurred width is practically inacceptable, because, when the slit width $l_O$ is 10 mm, and the effective F-No. of the projecting optical system is 10, the blurred width $\Delta l'$ of the slit image 7 on the photosensitive body 6 will amount to approximately 0.2 mm when the rotational angle $\theta$ is 25 degrees, as shown in FIG. 2.

SUMMARY OF THE INVENTION

It is therefore the primary object of the present invention to provide a projecting device having an optical system which is capable of correcting the light path length in a state of the image forming magnification being maintained constant, and of correcting the tilting of the image to be projected on the light receiving surface.

It is the secondary object of the present invention to provide a projecting device which is capable of favorably maintaining the image-forming magnification and the light path length with a simple construction.

According to the scanning and projecting device of the present invention, in which a deflector is interposed between a first plane and a second plane, and an image obtained by scanning the first plane with the deflecting device is sequentially projected onto a predetermined position on the second plane with lapse of time, the image projecting optical system provided between the deflector and the second plane is tilted in synchronism with the deflecting action of the deflector within the deflecting plane of the light beam from the first plane to be deflected by the deflector, and, at the same time, at least one part of the optical member forming the image projecting optical system is moved in the direction of the optical axis of the image projecting optical system in synchronism with the tilting motion.

Here, the phenomenon of tilting the image projecting optical system designates that an angle which the optical axis of the image projecting optical system forms with respect to the second plane varies with lapse of time. Throughout this specification, therefore, the term "tilting the image projecting optical system" means such phenomenon.

Theoretically speaking, in the scanning and projecting device according to the present invention, there is established no particular relationship between the deflecting angle of the beam to be deflected by the deflector and the tilting angle of the image projecting optical system, although it is possible to equalize a half of the beam deflecting angle and the tilting angle when the image forming magnification of the image projecting optical system to project the first plane onto the second plane (i.e., lateral magnification) is a single magnification. Here, the deflected beam is designated by a beam as deflected when a spatially fixed beam is deflected by a deflector, while the deflecting angle of the beam is meant by an angle formed by the deflected beam with respect to one of the abovementioned deflected beams which is set as a reference. In this case, when a mechanical deflecting device such as a galvano-mirror or rotatory polygonal mirror is used as the deflector, the rotational angle of the deflector becomes equal to the tilting angle of the image projecting optical system.

In the scanning and projecting device according to the present invention, when the galvano mirror or the rotatory polygonal mirror having a reflecting mirror for its deflecting surface is used, the rotational center of the deflecting surface of the deflector may, or may not, be coincided with the center of the tilting motion of the image projecting optical system. In case, however, the rotational angle of the deflector and the tilting angle of the image projecting optical system are equal as mentioned in the foregoing, a coincidence between the rotational center position of the deflecting surface and the tilting center position of the image projecting optical system contributes to simplification of the device.

It goes without saying that the scanning and projecting device according to the present invention is useful in the image projecting system of a reversed type, wherein informations are provided at a predetermined position on the second plane, and are projected on the first plane. For example, the abovementioned image projecting optical system of a type, wherein the information on the first plane is projected on the second plane, is applicable to a reproduction apparatus, while the image projecting optical system of the type opposite to the above is applicable to a phototypesetting device, and so forth.

BRIEF DESCCRIPTION OF DRAWING

FIGS. 9A and 9B are diagrams showing a lens system applicable to the device according to the present invention;

FIGS. 10, 11, 12 and 13 are, respectively, graphical representations showing various characteristics when the lens system shown in FIG. 9 is applied to the reproduction apparatus shown in FIG. 7;

FIGS. 14 and 15 are also graphical representations for explanation of the scanning speed on the plane of an image original in the reproduction apparatus shown in FIG. 7;

DESCRIPTION OF PREFERRED EMBODIMENTS

Figure 1:
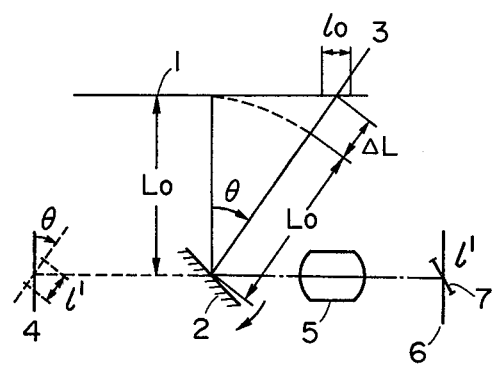
FIGS. 1 and 2 are schematic diagrams for explanation of some difficulties in the conventional scanning and projecting device.
Figure 2:
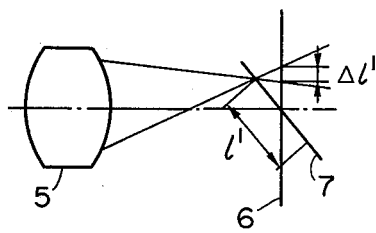
Figure 3:
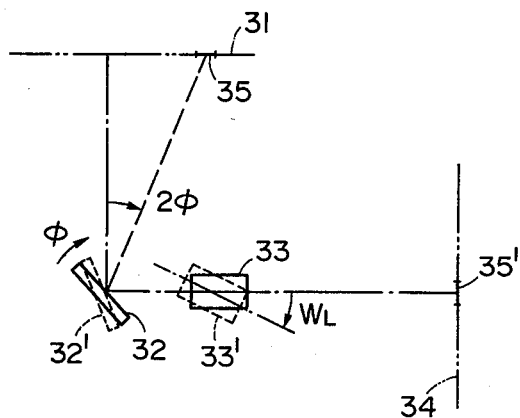
FIGS. 3, 4, 5 and 6 are, respectively, schematic diagrams for explanation of the scanning and projecting device according to the present invention.

FIG. 3 is a schematic diagram for explanation of the principle of the present invention, in which a rotatory mirror is used as the mechanical deflector. In the drawing, 31 refers to a flat image original plane to be the scanning plane (first plane); 32 designates the rotatory mirror as the deflector; 33 indicates an image projecting lens constituting the image projecting optical system; and 34 refers to the abovementioned light receiving plane (second plane).

In the device shown in FIG. 3, the image original plane is scanned by the oscillatable mirror 32, and an image 35' of a partial image original plane 35 is formed on a certain definite position on the light receiving plane 34 by the lens 33 which is tilted in synchronism with oscillation of the oscillatory mirror 32, and which has varying main point position and the focal length.

The reason for tilting the abovementioned lens 33 in synchronism with rotation of the rotatory mirror 32 is as follows.

Figure 4:
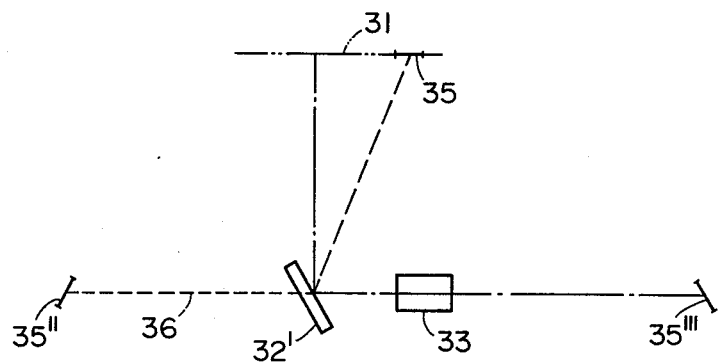

When the mirror 32 is tilted to position 32', if the lens 33 is maintained at a fixed position, an image 35'', of the partial image original plane 35 on the image original plane 31 becomes inclined as shown in FIG. 4. A numeral 35'' in FIG. 4 designates a mirror image of the partial image original plane by the mirror 32'. This mirror image 35'' changes its angle of inclination with respect to the optical axis 36 of the lens 33 with rotation of the mirror 32'. Accordingly, when the lens 33 is not tilted, the image 35''' of the mirror image 35'' formed by the lens 33 with 35'' as an object also changes its angle of inclination with respect to the optical axis 36. The angle of inclination becomes greater as the rotational angle of the mirror 32 becomes larger. In such case, if it is desired to obtain a high image quality, the light receiving plane 34 should be inclined in accordance with inclination of the image 35'''. However, it is practically difficult to tilt the light receiving plane 34 in accordance with oscillation of the mirror 32. In the present invention, therefore, the lens 33 is rotated by $W_L$ with respect to a rotational angle $\phi$ of the mirror, as shown in FIG. 3, thereby forming the image 35' which is substantially parallel with the light receiving plane 34.

On the other hand, the reason for making the main point position and the focal length of the lens 33 variable are as follows.

In FIG. 4, when the mirror 32 rotates, the position of the mirror image 35'' of the partial image original surface 35 on the image original plane 31 changes, and there takes place change in the image forming magnification due to the lens 33. In order to prevent this, i.e., in order to maintain constant the image forming magnification, some of the constituent elements of the lens 33 are moved along the optical axis to thereby vary the main point position and the focal length of the lens 33.

There is a dependency among the tilting quantity, the main point position changing quantity, and the focal length changing quantity of the lens 33, about which the following explanations are given.

Figure 5:
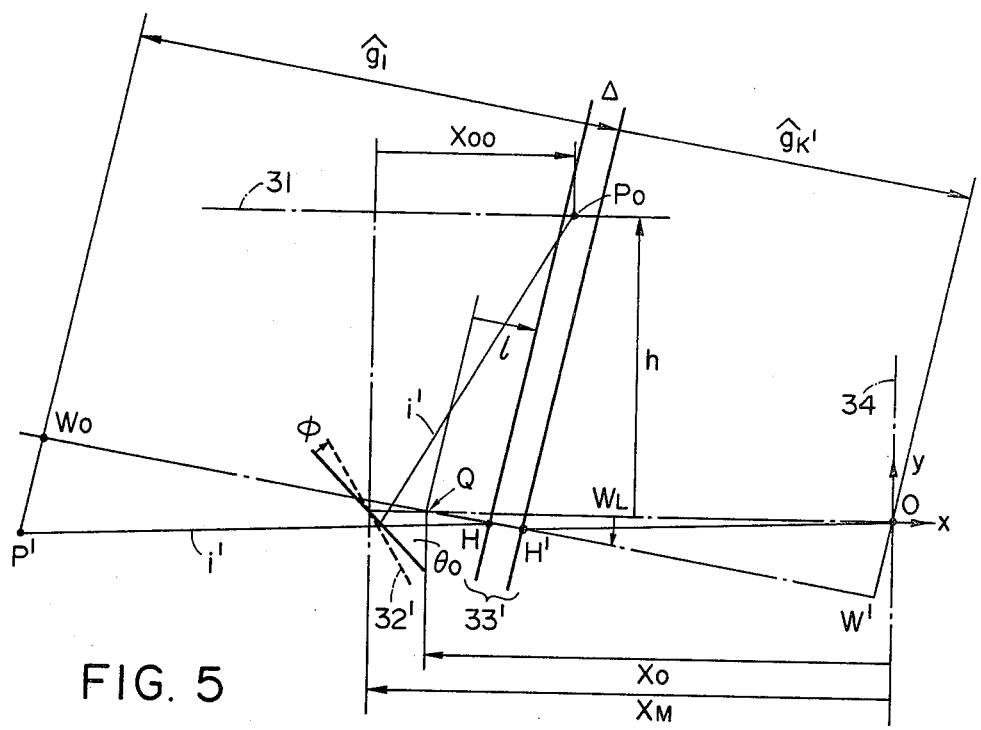

In FIG. 5, an orthogonally intersecting coordinate system having its original point O on the light receiving plane 34, the oscillating center of the oscillatory mirror 32, and the tilting center of the lens 33 are placed on the axis x; the rotational angle of the mirror 32 is $\phi$; the rotational angle of the lens 33 is $W_L$; a distance from the rotational center of the lens 33 to the front main point of the lens is l; the main point interval of the lens 33 is $\Delta$; a distance from the oscillating center of the mirror 32 to the image original plane is h, a coordinate of the oscillating center of the mirror 32 is $(X_M, O)$; and a coordinate of the rotational center of the mirror 33 is $(X_O, O)$. Then, a coordinate $(X_{HP}, Y_{HP})$ of the front main point of the lens 33 is represented by the following equation:

$$\begin{cases} X_{HP} = X_O + l \cos W_L \\ Y_{HP} = l \sin W_L \end{cases} \quad (1)$$

while the coordinate $(X_{HR}, Y_{HR})$ of the rear main point of the lens 33 is represented by the following equation:

$$\begin{cases} X_{HR} = X_O + (l + \Delta) \cos W_L \\ Y_{HR} = (l + \Delta) \sin W_L \end{cases} \quad (2)$$

In this optical system, if a desired image forming magnification is $\beta$, and a conjugative point of the original point O on the light receiving plane 34 is P', its coordinate $(X_{PD}, Y_{PD})$ is represented as follows.

$$\begin{cases} X_{PD} = \frac{1}{\beta} X_{HR} + X_{HP} \\ Y_{PD} = \frac{1}{\beta} Y_{HR} + Y_{HP} \end{cases} \quad (3)$$

Further, if an angle of the mirror 32 at its reference position is $\phi_O$, and a vertical line is drawn from the point P' to an extension of a mirror 32' which is in a state of being rotated by $\phi$ from the reference position, the coordinate $(X_{MD}, Y_{MD})$ of the intersection between the extension and the vertical line can be represented as follows.

$$X_{MD} = \tfrac{1}{2} \sin 2(\phi + \phi O) \cdot \qquad (4)$$
$$\{X_M' \cdot \tan(\phi + \phi O) + \frac{X_{PD}}{\tan(\phi + \phi O)} + Y_{PD} - Y_M'\}$$
$$Y_{MD} = (X_{MD} - X_M') \cdot \tan(\phi + \phi O) + Y_M'$$
(where: $X_M' \equiv X_O + (X_M - X_O) \cdot \cos W_L$
$Y_M' \equiv (X_M - X_O) \cdot \sin W_L$)

Further, when a point of the mirror image due to the mirror 32' at the point P' is $P_O$, the coordinate $(X_{PO}, Y_{PO})$ can be represented as follows:

$$\begin{cases} X_{PO} = 2X_{MD} - X_{PD} \\ Y_{PO} = 2Y_{MD} - X_{PD} \end{cases} \quad (5)$$

Here, since the point $P_O$ should be contained in the image original plane 31, the following relationship may always be satisfied, provided that $Y_{PO} = h$ in the equation (5) above.

$$h = 2 Y_{MD} - Y_{PD} \quad (6)$$

In this instance, the focal length f of the lens is variable, on account of which the main point interval $\Delta$ also changes generally. Therefore, from the following relationship of:

$$R \equiv f(-\beta - \frac{1}{\beta} + 2) + \Delta$$
$$= -g + g_K + \Delta$$
$$= (\frac{1}{\beta} - 1)(X_O \cos W_L + l + \Delta) + \Delta,$$

the following equation (7) can be derived:

$$l = \frac{\beta f}{1 - \beta}(-\beta - \frac{1}{\beta} + 2) - X_O \cos W_L - \Delta \quad (7)$$

The above equation (7) denotes a distance from the rotational center of the mirror 32 to the front main point of the lens 33.

If the focal length f and the main point interval $\Delta$ of the lens 33 are the known quantities, the equation (7) is substituted for the equations (1) and (2) for calculation of the equations (3) and (5), whereby the rotational angle $\phi$ of the mirror or the tilting angle $W_L$ of the lens which satisfies the equation (6) can be determined. The focal length and the main point interval $\Delta$ of the lens are determined from the construction and power arrangement of the lens 33.

In the above explanations, it has been stated that the rotational center of the mirror 32 and the tilting center of the lens 33 are generally different, and that the rotational angle of the mirror and the tilting angle of the lens are different. However, when the rotational center of the mirror is coincided with the tilting center of the lens, and the rotational angle of the mirror is coincided with the tilting angle of the lens, there may be attained simplification of the driving system for the mirror and the lens in the device. In this case, $X_O$ in the equations (1) and (2) is rewritten into $X_M$, and $\phi$ in the equation (4) is rewritten into $W_L$, whereby the rotational angle $W_L$ of the mirror and the lens with respect to the focal length f and the main point interval $\Delta$ of the lens can be determined.

In the foregoing description, quantitative symbols for the angles $\phi_O$, $\phi$ and $W_L$ may be represented in "negative" when they are coincident with the rotational direction of a clock hand, and in "positive" when they are opposite thereto.

Furthermore, when the image forming magnification of the image projecting system (i.e., the lateral magnification) is an equal magnification, it is possible to equalize one half of the beam deflecting angle and the tilting angle of the image projecting optical system. Accordingly, when the deflecting plane of the deflector is constituted with the galvano mirror or rotatory polygonal mirror, the rotational angle of the deflector and the tilting angle of the image projecting optical system becomes equal. Thus, when the rotational angle of the deflector is equal to the tilting angle of the image projecting optical system, the driving system for the mirror and lens can be more simplified by equalizing the rotational center position of the deflector and the tilting center position of the image projecting optical system. In this instance, the center position common to both deflector and image projecting optical system can be established arbitrarily. One embodiment of such scanning type image projecting device is schematically shown in FIG. 6.

Figure 6:
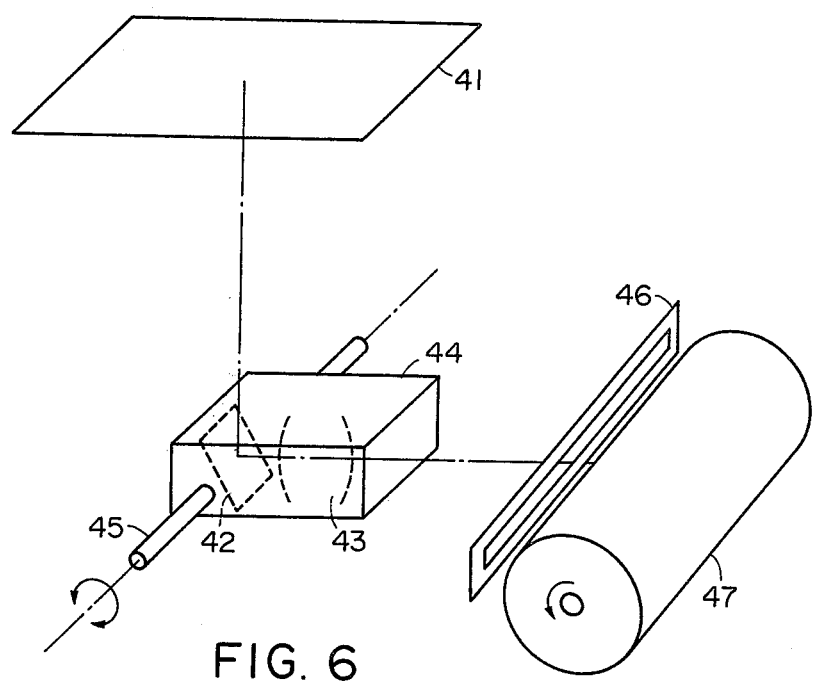

In FIG. 6, 41 refers to a scanning plane, 42 a deflecting mirror, 43 an image projecting lens system, 44 a casing for accommodating therein the deflecting mirror 42 and the projecting lens system, both being fixedly mounted in the casing 44. The casing 44 is freely rotatable on a rotational shaft 45 fixedly provided in the casing. The rotational shaft 45 can be provided at any arbitrary position. A part, or all, of the lenses constituting the image projecting lens system 43 move on the optical axis thereof in correspondence to a rotational angle of the casing 44. 46 designates a slit. A slit image of this slit due to the projecting lens system 43 is formed on the scanning plane 41. Accordingly, the scanning plane 41 is subjected to a flying image scanning with rotation of the casing 44 through this slit 46, whereby a partial image of the scanning plane 41 is formed on a light receiving surface 47 in the form of a rotatory cylinder. Rotation of the light receiving surface 47 is synchronised with rotation of the abovementioned casing 44.

In the above-described manner, since the device according to the present invention provides the deflector and the projecting optical system on a common base plate by coinciding the rotational angle and the rotational center of the deflector and the projecting optical system, and this base plate can be rotated on the rotational center of the base plate, the driving mechanism for the deflector and the projecting optical system can be simplified.

Figure 7A:
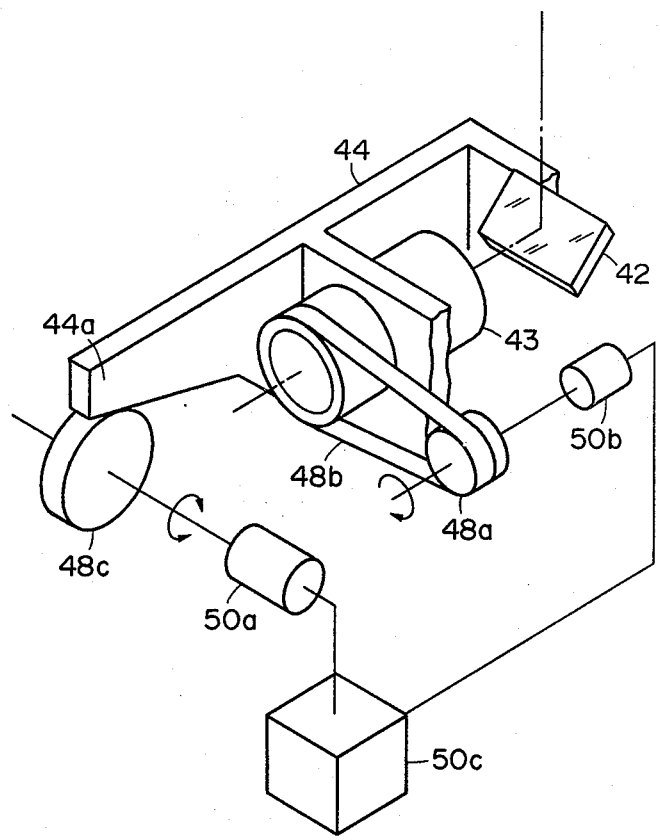
FIGS. 7A and 7B are, respectively, schematic, perspective views, in partial cross-section, showing one embodiment of a tilting and light path correcting means for the device according to the present invention.
Figure 7B:
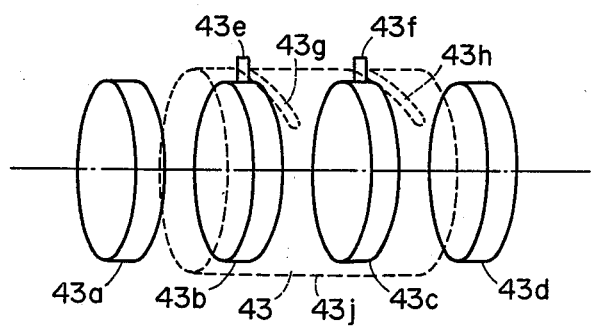

FIGS. 7A and 7B illustrate one embodiment of a mechanical expedient for correcting tilting angle and light path length of the deflector and the projecting lens in the scanning and projecting device according to the present invention. In FIGS. 7A and 7B, a projecting lens system 43 consisting of a plurality of lens elements (43a, 43b, 43c and 43d) are fixedly mounted on the casing 44. The deflecting mirror 42 is also fixedly mounted on the casing 44. One part 44a of the casing 44 contacts a cam face of a peripheral cam 48c which is rotated by a drive motor 50a. Following the shape of the peripheral cam 48c, and a fitting position of the shaft of the peripheral cam, and with rotation of the peripheral cam, the casing 44 moves up and down. At a position opposite to the abovementioned part 44a of the casing 44, the casing 44 is pivotally supported by a shaft (not shown), and it oscillates on this shaft. On the other hand, the lens elements (43b, 43c) of the projecting lens system 43 are those lens elements which displace in the direction of the optical axis with the abovementioned tilting. Pins 43e, 43f are fixedly provided on these respective lens elements 43b, 43c. These pins are fitted in cam grooves 43g, 43h formed in the rotational lens barrel 43j as shown with dotted line, whereby the lens elements 43b, 43c move with rotation of the lens barrel 43j. The lens barrel 43j is further coupled with a rotational pulley 48a and a belt 48b to be rotated by the drive motor 50b, and therefore is rotated with rotation of this rotational pulley. The motor 50b and the rotational pulley 48a are fixed to the casing 44, and perform their oscillatory motion with oscillation of the casing 44. The motor 50a to oscillate the casing 44 and the motor 50b for rotating the pulley 48a are driven by signals from an electrical control circuit 50c for controlling driving of the respective motors. Accordingly, by this drive control expedient 50, the deflecting angle of the mirror 42 and the oscillating angle of the casing as well as the deflecting angle of the mirror 42 and the movement of the lens elements (43b, 43c) can be controlled with a predetermined relationship.

Figure 8:
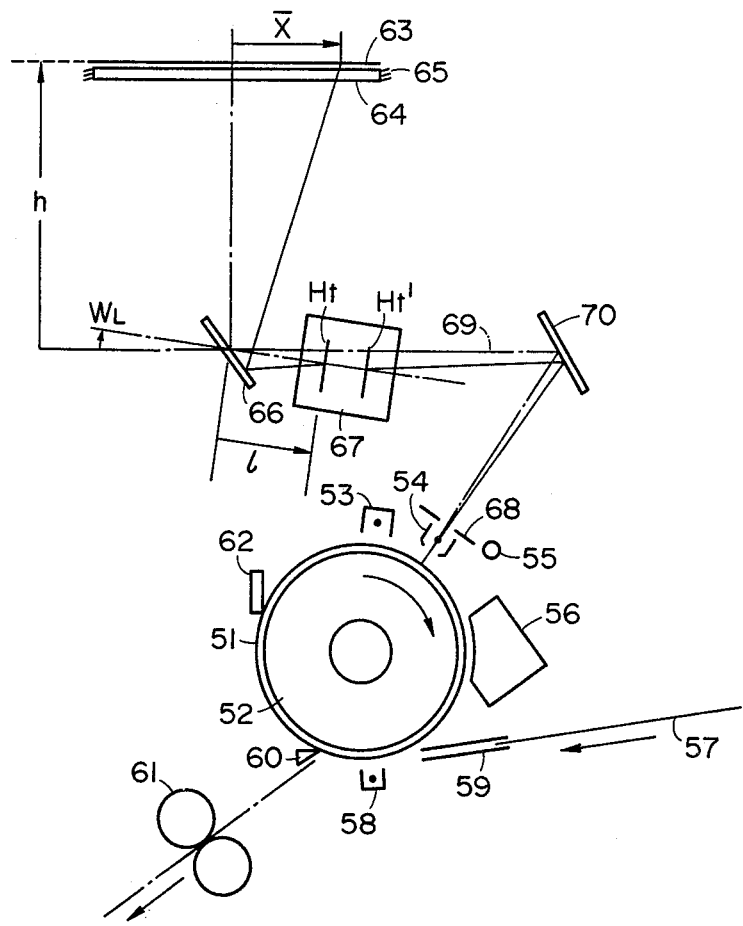
FIG. 8 is a side elevational view in cross-section showing one embodiment, wherein the scanning and projecting device of the present invention has been applied to a reproduction apparatus.

FIG. 8 shows a schematic side elevational view of a reproduction apparatus as one embodiment of utilizing the scanning and projecting device according to the present invention. The device in FIG. 8 is of such a construction that the rotational center of the projecting lens system 67 is coincided with the oscillating center of the oscillatory mirror 66. In FIG. 8, a drum 52 having on its peripheral surface a photosensitive member 51 consisting of an electrically conductive substrate, a photoconductive layer, and a transparent surface insulative layer in lamination is supported at a fixed position in the device, and rotated by an electric motor (not shown) in an arrow direction at a constant speed. The rotational speed of the drum 52 is constant to any reproduction magnification. The surface of the photosensitive member 51 is first uniformly charged by a d.c. corona discharger 53. Subsequently, the photosensitive member 51 is subjected to a slit exposure of a light image of an image original to be reproduced by an optical system to be described later, and, at the same time, is subjected to corona discharge by a d.c. corona discharger 54 in the polarity opposite to that of the a.c. discharger 53. A slit opening is formed in the discharger 54 to permit passage of image forming light beam. The photosensitive member 51 is uniformly illuminated on its overall surface by a lamp 55, whereby an electrostatic latent image of the image original is formed thereon with high contrast. This latent image is developed into a visible image by feeding toner to the photosensitive member 51 from a developer 56 such as a magnet brush type developer, etc.. The thus obtained visible toner image is then transferred onto an image transfer paper 57 which is fed at the same speed as the peripheral speed of the drum 52, while being subjected to discharge in the polarity opposite to that of the toner charge on the back surface thereof by the corona discharger 58 so as to increase the image transfer efficiency. The image transfer paper is taken out of a paper cassette (not shown) sheet by sheet in synchronism with the drum rotation, and is caused to contact the photosensitive member 51 through a guide member 59, after which it is separated from the photosensitive member 51 by a pawl 60. Conveying mechanism for the image transfer paper is well known. The toner image which the image transfer paper 57 bears is fixed by an image fixing device 61 such as heat roller type image fixer, etc.. On the other hand, the toner remaining on the surface of the photosensitive member 51 after completion of the image transfer operation is removed by a cleaning device 62 such as a rubber blade, etc. which is press-contacted to this photosensitive member. The cleaned surface of the photosensitive member 51 is again engaged with the subsequent image forming process.

The image original 63 for reproduction is mounted on a transparent, flat table 64, and remains stationary thereon. The image original table 63 is fixed to an immovable member 65 such as a side plate, etc. of the main body of the reproduction apparatus.

The image original 63 is subjected to a flying image scanning with oscillation of the oscillatory mirror 66 by an image of a slit 68 to be formed by a projecting lens system 67.

In the following, more detailed explanations will be given as to the oscillatory mirror 66 and the projecting lens system 67. In FIG. 8, when the coordinate is taken as shown in FIG. 6, a position where the optical axis of the projecting lens system and the photosensitive member mutually intersect constitutes the original point O when the oscillatory mirror 66 is at a reference position. The optical axis 69 is on the x axis, and a direction passing through the original point O and orthogonally intersecting with the x shaft within the plane of the paper is the y axis.

Now assume that a distance h between the rotational center of the mirror 66 and the lens 67 and the image original plane is h=800 mm, the coordinate $X_M$ of the rotational center of the mirror and lens is $X_M = -1233.6$ mm, and an angle $\phi_O$ which the mirror surface and the x axis form at the reference position of the mirror 66 is $\phi_O = -45°$. In this case, the lens is of a symmetrical, four-group construction, as shown in FIG. 9A. By moving the inner two groups as a pair relative to the outer lens groups, the focal length can be varied.

In FIG. 9A, the power of the first lens group I and the fourth lens group IV is $\phi I$, the power of the second lens group II and the third lens group III is $\phi II$, the main point interval between the first group and the second group and that between the third group and the fourth group are e'I, and the main point interval between the second group and the third group is e'II, the power of the total lens system $\Phi$ (which is a reciprocal of the focal length) is represented by the following equation (8), while the main point interval of the total lens system $\Delta$ (Ht, H't) is represented by the following equation (9).

$$\Phi = e_1'^2(2\phi_I - Be_{II}')B + 2e_I'(ABe_{II}' - A\phi_I - B) + A(2 - Ae_{II}') \quad (8)$$

$$\Delta = e_{II}' + 2(HH_I'0 + HH_{II}') + 2[e_I'\{1 - \phi_{II}/(A - e_I'B)\} - \{e_{II}' + 2e_I'\phi_I/(A - e_I'B)\}(A - e_I'B)/\phi] \quad (9)$$

(where: $A \equiv \phi_I + \phi_{II}$, $B \equiv \phi_I \phi_{II}$, $HH'_I$ denotes the main point interval of the first and fourth groups, respectively; and $HH'_{II}$ denotes the main point interval of the second and third groups, respectively.) In this embodiment, there is used a lens system satisfying the following relationship.

$\phi_I = -2.489 \times 10^{-3}$ $\phi_{II} = 3.309 \times 10^{-3}$ $2e'_I + e'_{II} = 147.02$ FIG. 9B shows the cross-section of the concrete construction of the lens, the actual data of which are given in the following.

| | | |
|---|---|---|
| $R_1 = -R_{25} = 145.81$ | $D_1 = D_1 = D_{24} = 6.77$ | $N_1 = N_{12} = 1.62360$ |
| $R_2 = -R_{24} = 219.88$ | $D_2 = D_{23} = 18.50$ | |
| $R_3 = -R_{23} = -179.27$ | $D_3 = D_{22} = 3.21$ | $N_2 = N_{11} = 1.55957$ |
| $R_4 = -R_{22} = 113.19$ | $D_4 = D_{21} = 4.18$ | |
| $R_5 = -R_{21} = 123.09$ | $D_5 = D_{20} = 11.71$ | $N_3 = N_{10} = 1.53269$ |
| $R_6 = -R_{20} = 1016.4$ | $D_6 = D_{19} = (l_1)$ | |
| $R_7 = -R_{19} = \infty$ | $D_7 = D_{18} = 8.35$ | $N_4 = N_9 = 1.69346$ |
| $R_8 = -R_{18} = -168.75$ | $D_8 = D_{17} = 0.08$ | |
| $R_9 = -R_{17} = -1790.5$ | $D_9 = D_{16} = 2.46$ | $N_5 = N_8 = 1.66691$ |
| $R_{10} = -R_{16} = 178.1$ | $D_{10} = D_{15} = 2.90$ | |
| $R_{11} = -R_{15} = 202.12$ | $D_{11} = D_{14} = 5.81$ | $N_6 = N_7 = 1.66986$ |
| $R_{12} = -R_{14} = \infty$ | $D_{12} = D_{13} = (l_2)$ | |

-continued

| | | |
|---|---|---|
| $R_{13} = \infty$ (aperature) | | |

Here, Ri, Di and Ni, respectively, denote the radius of curvature, the plane interval, and the refractive index of the i'th plane. $l_1$ and $l_2$ are variable by movement of the second and third lens groups. When $l_1 = 54.73$ and $l_2 = 6.42$, the focal length f of the entire lens system is f = 330.41. Also, in this lens system, the main point interval of the first and fourth groups is equal, i.e., HH'I = 5.93, while the main point interval of the second and third groups is equal, i.e., HH'II = 6.70.

Figure 10:
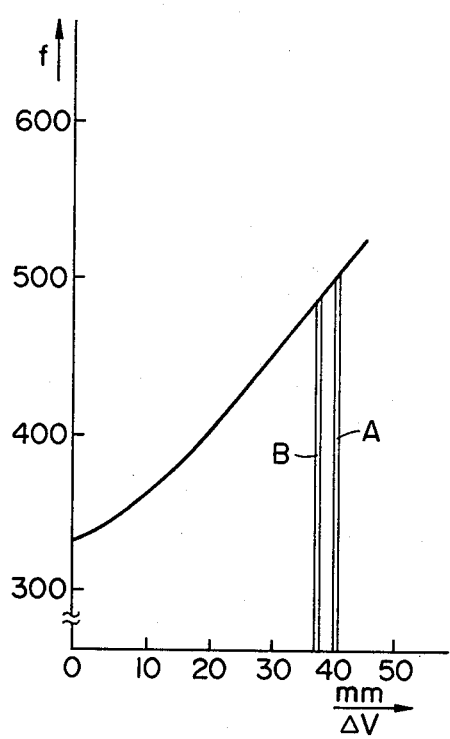
Figure 11:
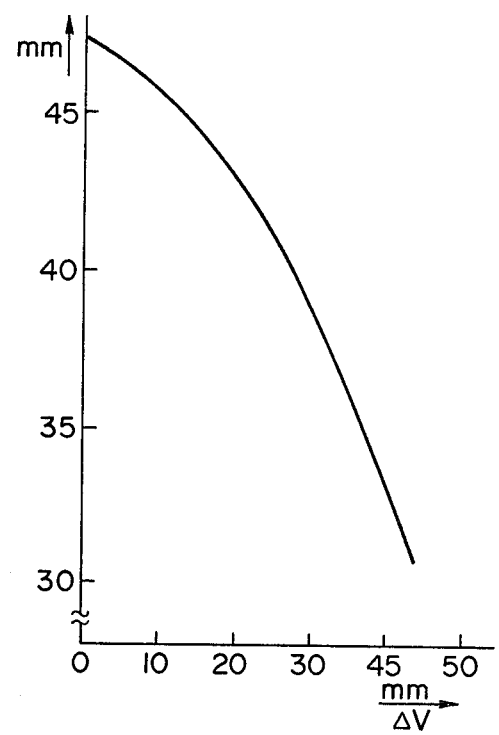

FIGS. 10 and 11, respectively, indicate variations in the focal length f and the main point interval $\Delta$ relative to the moving quantity $\Delta V$ of the second and third lens groups (the moving direction of the lens away from the aperture is taken "positive" direction) with the position of the second and third lens groups as the reference, when f = 330.41.

Figure 12:
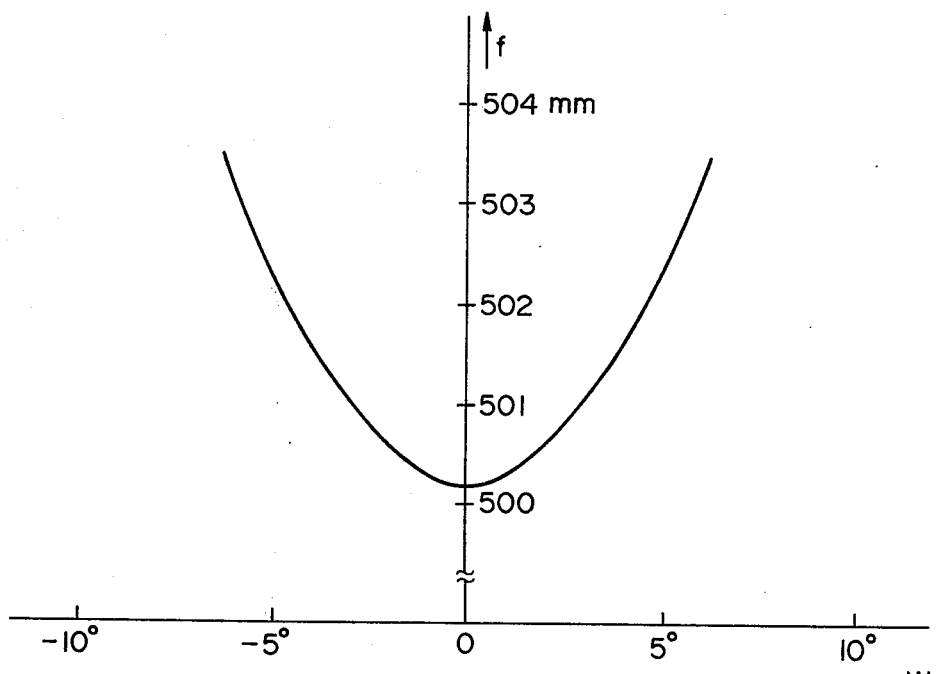

In the lens system shown in FIG. 8 above, when the reproduction is performed with an equal magnification, the reference (or minimum) focal length is 500.17. FIG. 12 shows a relationship between this focal length f and the tilting angle $W_L$. As is apparent from FIG. 12, when the tilting angle is within $\pm 7°$, the focal length is between approximately 500 mm and 504 mm. Accordingly, the moving quantity $\Delta V$ of the second and third lens groups exists in the range of about 40 to 41, as shown by section A in FIG. 10.

Using the abovementioned lens system, when the focal length of the lens is varied with respect to the rotational angle $W_L$ of the mirror and the lens as shown in FIG. 12 so as to constantly maintain the image forming magnification of $\beta = -1$, and the distance l between the oscillating center of the mirror and the front main point of the lens is varied with respect to the rotational angle $W_L$ as shown in FIG. 13, the scanning position $\overline{X}$ on the image original plane becomes substantially rectilinear as shown in FIG. 14. When a relationship of $\overline{X}_O = 35.492 \times W_L$ is regarded as an ideal scanning relationship, an error in this embodiment $$\left( \frac{\overline{X} - \overline{X_o}}{\overline{X}} \times 100 \, (\%) \right)$$

will be as shown in FIG. 15.

Figure 16:
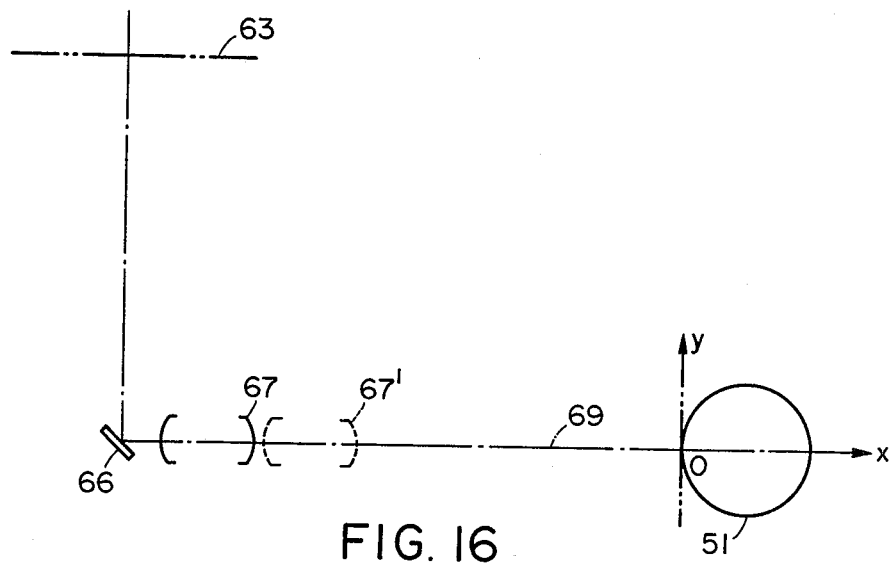
FIG. 16 is a schematic diagram showing a modified embodiment of the reproduction apparatus shown in FIG. 7.
Figure 17:
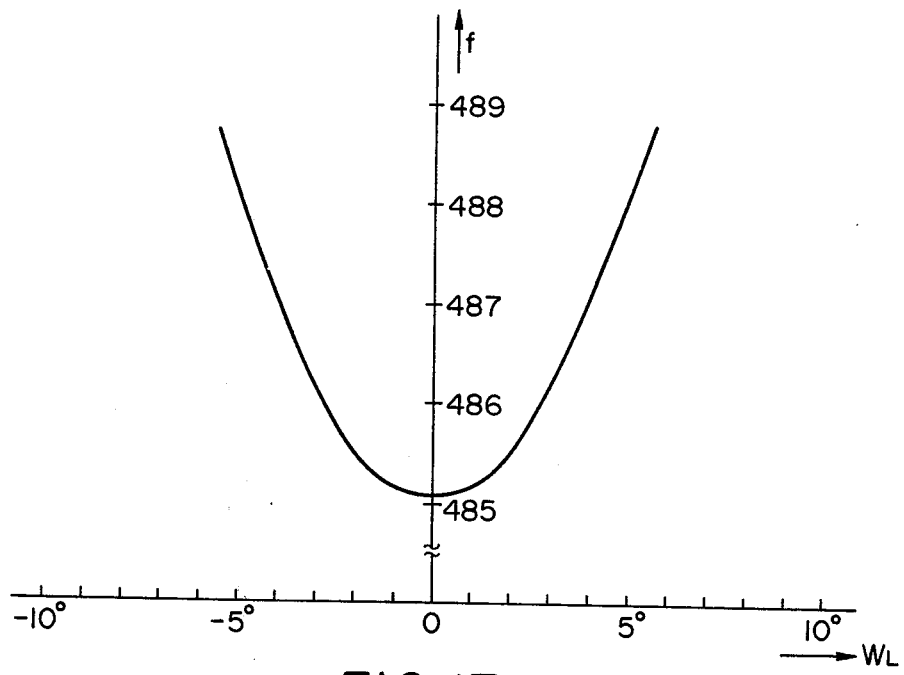
FIGS. 17 and 18 are graphical representations showing various characteristics of the image projecting lens system in the reproduction apparatus shown in FIG. 16.
Figure 18:
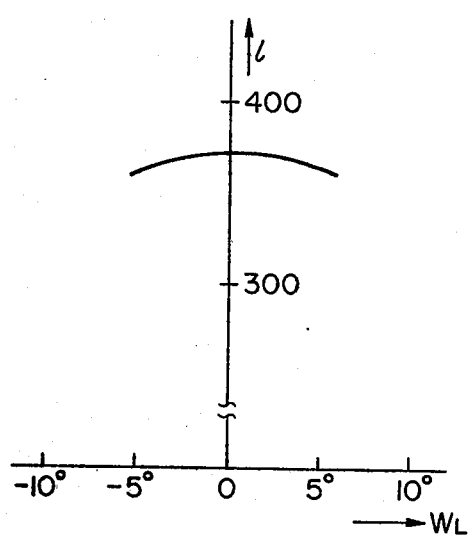
Figure 19:
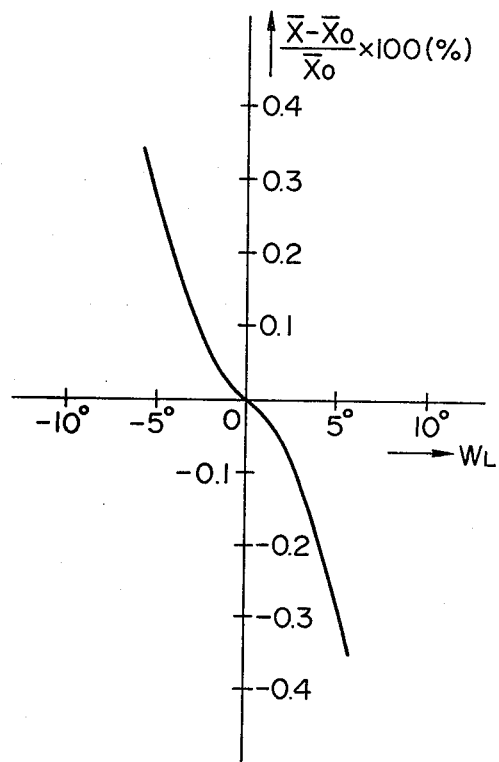
FIG. 19 is a graphical representation for explanation of the scanning speed on the plane of an image original in the reproduction apparatus shown in FIG. 16.

In FIG. 16, it is assumed that the arrangement of the optical system in equal image-forming magnification as shown in FIG. 7, as described above, consists of the mirror 66 and the lens 67, and that there is a case wherein the image-forming magnification is desired to be varied in this arrangement. For instance, an image original in A-3 size is to be reduced to A-4 size. In such case, it is sufficient that only the image projecting lens system 67 be moved to a position 67' to vary its reference focal length, while the oscillating mirror 66 remains as it is. In the above-described equal magnification, the reference (minimum) focal length was 500.17. However, in the case of reducing the size from A-3 to A-4, the reference (minimum) focal length of the projecting lens system is 485.05. In the standard condition, the distance l from the oscillating center of the oscillating mirror 66 to the front main point Ht of the projecting lens system is 200.34, while it is 370.98 in the case of size-reduction. It goes without saying that the term "standard condition" designates a state of $W_L = O$. In the abovementioned case of size-reduction, the image-forming magnification is $\beta = -0.70714$. FIG. 17 shows variations in the focal length f of the projecting lens system to its tilting angle $W_L$ in such case. As shown in FIG. 17, with the tilting angle $W_L$ being $\pm 6°$, the variations in the focal length f ranges from 485 mm to 489 mm, at which time the moving quantity $\Delta V$ of the lens in the second and third groups is approximately 37 to 38 as shown by section B in FIG. 10. FIG. 18 shows variations in the distance l from the oscillating center of the oscillatory mirror 66 to the front main point of the projecting lens system in such case. When the ideal scanning position $\overline{X}_O$ on the image original plane in this case is $\overline{X}_O = 44.402 \times W_L$, the positional error $$(\frac{\overline{X} - \overline{X}_o}{\overline{X}_o} \times 100\%)$$

becomes as shown in FIG. 19.

As is apparent from FIGS. 15 and 19, the scanning and projecting device according to the present invention is capable of scanning the image original surface at a substantially constant speed by rotation of the deflecting mirror without giving the projecting lens system any particular distortion characteristic such as, for example, f-$\theta$ characteristic.

Figure 20:
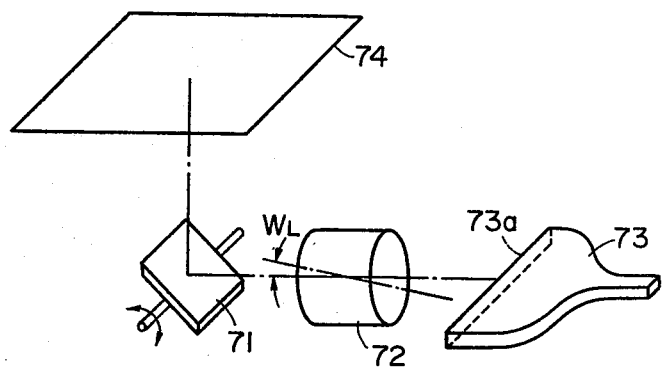
FIG. 20 is a schematic perspective view of another embodiment, wherein the scanning and projecting device of the present invention has been adopted.

FIG. 20 illustrates one example of utilization of the scanning and projecting device according to the present invention. What is different in this embodiment from the foregoing embodiment is that the projecting direction is just opposite. In this embodiment, the deflector 71 and the projecting lens system 72 perform the same operations as those in the abovementioned projecting system. A reference numeral 73 refers to CRT or a circle-line converter, on which an information for one line to be written in on the surface 73a is displayed. The information on this surface 73a is projected onto a flat surface 74 for write-in through the projecting lens system and the deflector. The information is introduced as inputs onto the plane 73a with lapse of time, and are sequentially projected onto the write-in surface by oscillation of the deflector 71. Further, a means equivalent to the means for displaying information on the surface 73a can be constructed readily by use of other optical means.

What is claimed is:

1. A scanning and projecting device comprising:
   (a) a first fixed plane, the surface of which is subjected to scanning;
   (b) a second plane, on which an image of the first plane is projected;
   (c) a deflector interposed between said first plane and second plane for reflecting a partial image of said first plane onto a predetermined position of said second plane with lapse of time;
   (d) a projecting optical system interposed between said deflector and said second plane for rendering said first and second planes in an optically conjugative positional relationship;
   (e) means for tilting said overall projecting optical system in synchronism with rotational action of said deflector; and
   (f) means for moving at least one part of the optical elements constituting said projecting optical system in synchronism with rotational action of said deflector.

2. The scanning and projecting device as set forth in claim 1, wherein the center of tilting of said projecting optical system is on the deflecting and reflecting plane of said deflector.

3. The scanning and projecting device as set forth in claim 2, wherein said deflector is a galvano-mirror, and the center position for tilting said projecting optical system coincides with the oscillating center of said galvano-mirror.

4. The scanning and projecting device as set forth in claim 1, wherein one half of the deflecting angle of the beam to be deflected by the deflecting action of said deflector is equal to the tilting angle of said projecting optical system.

5. A scanning and projecting device, comprising:
   (a) a first fixed plane, the surface of which is subjected to scanning;
   (b) a second plane, on which an image of said first plane is projected;
   (c) a projecting optical device interposed between said first plane and second plane for sequentially projecting a partial slit image of said first plane onto a predetermined position of said second plane, said projecting optical device comprising light beam reflecting means, a projecting optical system interposed between said light beam reflecting means and said second plane, and a casing, in which said light beam reflecting means and projecting optical system are fixedly provided, said casing oscillating with a predetermined axis as the center of its oscillation, and at least one part of the component elements constituting said projecting optical system displacing in the direction of the optical axis in synchronism with the oscillating action of said casing.

6. The scanning and projecting device as set forth in claim 5, wherein said light beam reflecting means is a reflecting mirror, and the center shaft for tilting said casing is substantially on the plane of said reflecting mirror.

7. A scanning and projecting device, comprising:
   (a) a fixed, flat scanning plane, the surface of which is subjected to slit-scanning;
   (b) a photosensitive plane, on which a slit-image of the scanning plane is sequentially projected with lapse of time;
   (c) a deflector interposed between said scanning surface and said photosensitive plane for scanning said scanning surface; and
   (d) an image-forming lens system interposed between said deflector and said photosensitive surface, to be tilted in synchronism with the deflecting action of said deflector with a predetermined axis as the center of tilting, and in which a lens constituting at least a part thereof moves in the direction of its optical axis in synchronism with the deflecting action.

8. The scanning and projecting device as set forth in claim 7, wherein said photosensitive member consists of an electrically conductive substrate, a photoconductive layer, and a transparent insulating layer in lamination in the order as specified.

* * * * *

UNITED STATES PATENT AND TRADEMARK OFFICE
CERTIFICATE OF CORRECTION

PATENT NO. : 4,270,858
DATED : June 2, 1981
INVENTOR(S) : KAZUO MINOURA, ET AL.

It is certified that error appears in the above—identified patent and that said Letters Patent is hereby corrected as shown below:

Column 1

Line 26, change "reflectng" to read --reflecting--.

Line 29, delete "a".

Column 3

Line 36, change "DESCCRIPTION" to read --DESCRIPTION--.

Column 6

Line 9, change "$g + g_K$" to read --$\hat{g} + \hat{g}_K$--.

Column 9

Line 58, delete "$D_1=$" (second occurrence).

Signed and Sealed this

Twentieth Day of October 1981

[SEAL]

Attest:

GERALD J. MOSSINGHOFF

Attesting Officer    Commissioner of Patents and Trademarks